United States Patent
Fortmann et al.

(10) Patent No.: US 8,378,514 B2
(45) Date of Patent: Feb. 19, 2013

(54) PHASE-ANGLE OFFSETTNG CONVERTER TO MINIMIZE DAMAGING EFFECTS OF SUDDEN PHASE CHANGES DUE TO NETWORK DISTURBANCE

(75) Inventors: Jens Fortmann, Berlin (DE); Heinz-Hermann Letas, Gross Meinsdorf (DE)

(73) Assignee: REPower Systems AG, Hamburg (DE)

( * ) Notice: Subject to any disclaimer, the term of this patent is extended or adjusted under 35 U.S.C. 154(b) by 334 days.

(21) Appl. No.: 12/447,200

(22) PCT Filed: Oct. 17, 2007

(86) PCT No.: PCT/EP2007/009005
§ 371 (c)(1),
(2), (4) Date: Apr. 24, 2009

(87) PCT Pub. No.: WO2008/049541
PCT Pub. Date: May 2, 2008

(65) Prior Publication Data
US 2010/0001527 A1 Jan. 7, 2010

(30) Foreign Application Priority Data
Oct. 24, 2006 (DE) .................. 10 2006 050 077

(51) Int. Cl.
H02P 9/04 (2006.01)
F02D 29/06 (2006.01)
(52) U.S. Cl. ...................... 290/44; 290/40 B
(58) Field of Classification Search .......... None
See application file for complete search history.

(56) References Cited

U.S. PATENT DOCUMENTS

| | | | | |
|---|---|---|---|---|
| 3,665,495 A * | 5/1972 | Carter et al. | .................. | 290/4 R |
| 5,883,796 A | 3/1999 | Cheng et al. | | |
| 6,362,988 B1 * | 3/2002 | Deng et al. | .................. | 363/148 |
| 6,919,650 B2 * | 7/2005 | Deng | .................. | 307/45 |
| 7,042,110 B2 * | 5/2006 | Mikhail et al. | .................. | 290/44 |
| 2003/0198065 A1 | 10/2003 | Hayashi et al. | | |

FOREIGN PATENT DOCUMENTS

| | | |
|---|---|---|
| EP | 1 168 566 A2 | 1/2002 |
| EP | 1 561 946 A2 | 8/2005 |
| EP | 1561946 A2 * | 8/2005 |

OTHER PUBLICATIONS

International Search Report, mailed Mar. 3, 2008, directed to counterpart International Patent Application No. PCT/EP2007/009005; 8 pages.

* cited by examiner

*Primary Examiner* — Quyen Leung
*Assistant Examiner* — Michael Andrews
(74) *Attorney, Agent, or Firm* — Morrison & Foerster LLP

(57) ABSTRACT

A system for a wind energy installation. The wind energy installation feeds electrical power into a power supply system. A phase control device can include a power supply system fault detector, a phase angle detector, and a signal processing module. When a power supply system fault is detected, a phase error signal can be determined. A preset angle signal can be determined based on the phase error signal. The preset angle signal can be provided to a converter which can emit electrical power having a phase angle corresponding to the preset angle signal into the power supply system. Accordingly, an undesirable sudden surge in power output resulting from a phase change occurring at the end of the power supply system disturbance can be avoided.

14 Claims, 4 Drawing Sheets

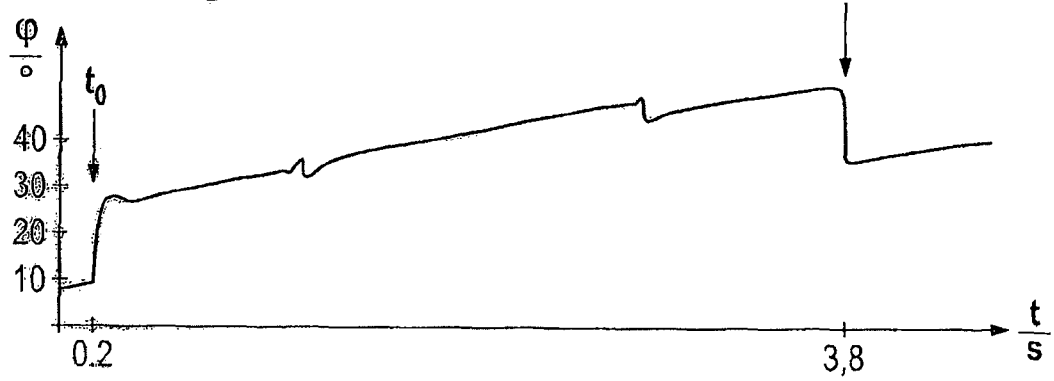
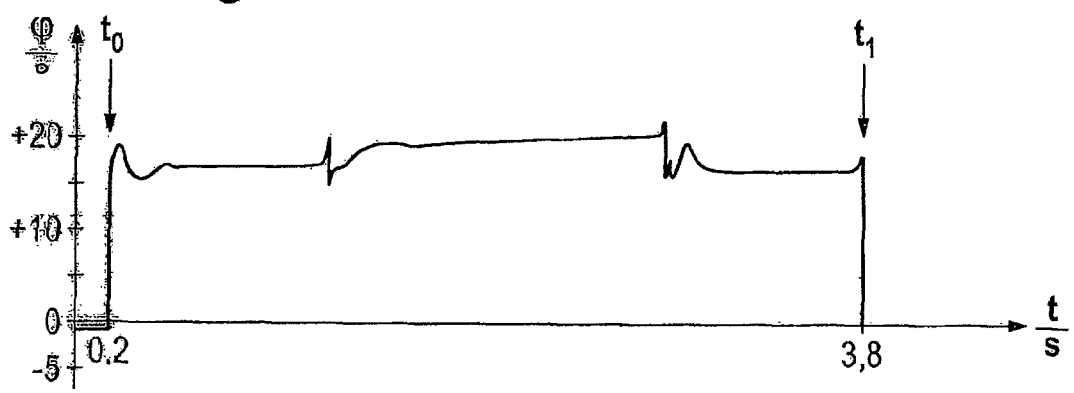
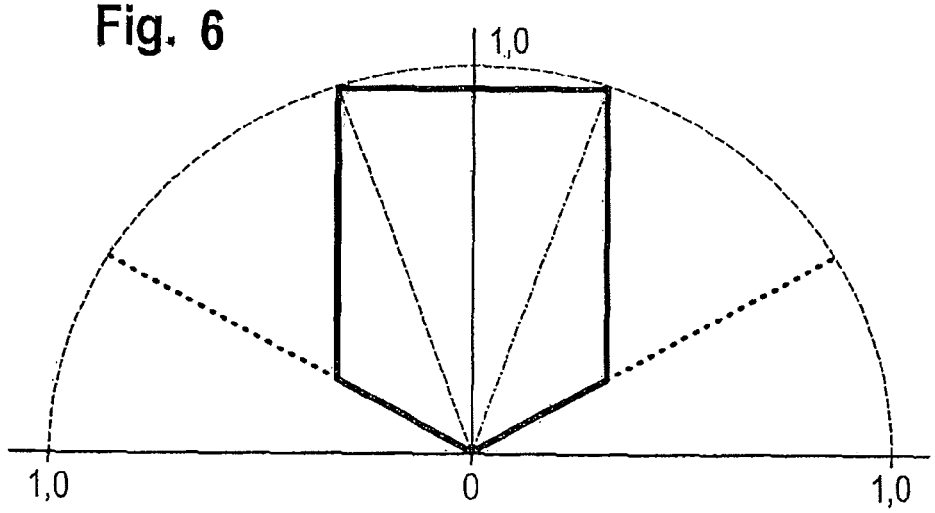

PHASE-ANGLE OFFSETTNG CONVERTER TO MINIMIZE DAMAGING EFFECTS OF SUDDEN PHASE CHANGES DUE TO NETWORK DISTURBANCE

REFERENCE TO RELATED APPLICATIONS

This application is a national stage application under 35 USC 371 of International Application No. PCT/EP2007/009005, filed Oct. 17, 2007, which claims the priority of German Patent Application No. 10 2006 050 077.6, filed Oct. 24, 2006, the contents of which prior applications are incorporated herein by reference.

FIELD OF THE INVENTION

The invention relates to a converter, in particular for wind energy installations having a generator which is driven via a wind rotor, for feeding electrical power into a network, with the converter having a control input for a phase angle of the electrical power which is emitted to the network.

BACKGROUND OF THE INVENTION

Converters are nowadays being increasingly used to feed electrical power into a network from local feeding power stations. These converters are particularly suitable for use with variable rotation-speed generators, such as those provided for modern wind energy installations. In this case, conversion to the frequency of the fixed-frequency supply network (normally 50 Hz) is required in order to feed in the wild-frequency electrical power produced by the generator. In the event of disturbances in the network, the phase angle of the voltage can change suddenly. It has been found that sudden phase changes can have similar negative effects on converters to those of voltage dips. In the case of conventional converters, overcurrents can therefore occur in the event of a sudden phase change, thus activating protective devices for the converter, such as its crowbar circuit. The activation of the protective devices changes the braking torque of the converter and of the generator connected to it, thus leading to undesirable reactions on the mechanical part. Torque oscillations can occur at the generator and on its drive train, which can lead to increased wear or even to failure.

Attempts have been made to use special additional circuits to prevent activation of the converter protective devices. For example, a chopper can be provided in an intermediate circuit of the converter which limits overvoltages or overcurrents occurring as a result of sudden phase changes, in the intermediate circuit itself. However, the additional circuits increase the production complexity and therefore increase the price of the converter. Furthermore, their power-handling capability is restricted, as a result of which they are frequently inadequate for high power levels. In addition, if the protective device is switched on frequently, reactions on the mechanical components of the wind energy installation can reduce their life.

SUMMARY OF THE INVENTION

The invention is based on the object of specifying a converter and a wind energy installation having a converter such as this, as well as a method for operation, which achieves a better response to sudden phase changes in the network.

In the case of a converter, in particular wind energy installations having a generator which is driven by a wind rotor, for feeding electrical power into a network, with the converter having a control input for a phase angle of the electrical power which is emitted to the network, the invention provides a phase control device which has a network fault detector, a phase angle detector and a nominal angle generator, with the latter having a signal processing module which is designed to determine a signal for a preset angle for the converter from the phase error signal of the phase angle detector when a network fault occurs, which signal is applied to the control input of the converter via a control line.

The essence of the invention is the idea of detecting the change in the phase angle which leads to the network disturbance and using this as the basis for phase-angle control of the converter. The occurrence of the disturbance is determined by means of the network fault detector in order, when a disturbance is identified, to determine a phase error signal by means of the phase angle detector from the phase angle in the network before and after the disturbance occurs. Based on the phase difference, the signal processor module determines an angle which is preferably calculated such that, at the end of the network disturbance and when the phase suddenly changes back again, this leads to no change, or as little change as possible, to the power that is fed in. This angle is applied to the control input of the converter, as a preset angle.

Conventionally, when a network disturbance occurs, a change in the phase is identified only after a delay, to be precise in particular when it changes suddenly. Before the change in phase is actually taken into account, the converter feeds into the network with an incorrect phase angle. In-phase current and reactive-current regulators which are provided on the converter can operate correctly, however, only when the phase angle is correct. If the phase angle is incorrect, only a small amount of in-phase current as provided can be fed into the network, and it is even possible for in-phase current to be parasitically drawn from the network rather than being fed into it. As a consequence of too little current being fed in (or the parasitic drawing), the energy level in the intermediate circuit of the converter rises, and this can lead to an overvoltage or an overcurrent in the intermediate circuit. These result in activation of the protective devices, such as triggering of the crowbar, with the negative effects mentioned initially on the drive train and the generator.

The invention has now identified the fact that the damaging effects of the phase suddenly changing back at the end of the disturbance on the converter and its control system, in particular its in-phase current control, can be minimized by deliberately presetting the phase angle. The preset angle can be chosen such that, when a sudden change back through a predetermined angle occurs, the power which is emitted remains unchanged. If, for example, a sudden phase change of +25 degrees occurs as a consequence of the network disturbance, then the preset angle of the converter is set to a value of +12.5 degrees; as a result of this, when a sudden phase change of a further 25 degrees occurs at the end of the network disturbance, the phase angle of the converter with respect to the network has a value of −12.5 degrees, and the power therefore remains constant. For this purpose, the processing module expediently has a lead module which is designed to determine a lead angle from the phase error signal.

The lead module is expediently in the form of a divider, to be precise preferably with a divisor of 2. This is based on the knowledge that, when the phase changes back suddenly at the end of the network disturbance, an angular magnitude can frequently be expected which corresponds to the magnitude of the sudden phase change that occurred at the start of the disturbance. It is then expedient to choose the preset angle to be half as great as the sudden phase change which occurred initially. This can be achieved in a simple and expedient manner by a divider with a divisor of 2.

A characteristic element is preferably additionally provided, which limits the lead angle to adjustable limit values. It is therefore possible to take account of restrictions relating to the possible phase angles of the wind energy installation and its converter. In particular, it has been proven to provide as limit values those angles which correspond to the maximum magnitude of the volt-amperes of the converter. It is also possible to provide for the characteristic element to be provided with a memory of permissible power and wattless-component ranges from which the limit values can be called up dynamically as a function of the respective power. This makes it possible to match the respective limit values to the instantaneous power situation of the converter and/or of its wind energy installation.

The phase angle detector can be provided with a pattern wave generator which is synchronized to the network frequency. This makes it possible to obtain a clean phase curve even when the network frequency is noisy, on the basis of which phase curve the sudden phase change can be determined more accurately. The accuracy and the speed of determination of the phase error signal are thus increased. It is expedient for the pattern wave generator to be in the form of a PLL circuit. This allows cleaner detection even when the network frequency is varying in a quasi-steady-state form.

According to one particularly advantageous embodiment, which may be used for independent protection, the network fault detector has a device for identification of the return of the network voltage and a switching device, which is connected to the control input of the converter and is designed to apply a reference frequency signal to the control input when the voltage returns. This makes it possible, when the network voltage returns, to once again set on the converter a phase angle that is the same as that before the occurrence of the disturbance. This means that the correct phase angle is available immediately when the voltage returns in all those situations in which the network phase once again assumes the original value before the disturbance at the end of the disturbance. This is also applicable when the phase does not suddenly change back again exactly, but a small phase error remains. The converter can then feed the maximum power into the network without any further delay.

The reference frequency signal is generally synchronized to the original network voltage. However, it is possible for the reference frequency signal to differ from this. This applies in particular to the phase. For example, the phase of the reference frequency signal may have an offset in the inductive sense. Since the phase angle is frequently inductive when the voltage returns, this makes it easier to connect the converter when the voltage returns.

The converter preferably has a protection unit which is designed to determine the phase angle difference between the network and the network-side inverter before and after a network voltage returns, and to switch off the network-side inverter when the phase angle difference rises. This is achieved in that the network-side inverter of the converter can be switched off when the phase difference of the network-side inverter increases when the network voltage returns. This results in maximum protection for the components of the converter even when the disturbance profile is poor.

A PLL circuit with a freewheeling device is preferably provided as the generator for the reference frequency signal, which is connected to the network frequency and is decoupled by means of the freewheeling device when a network fault occurs. This allows the reference frequency signal to be generated from the network frequency in a simple manner, and to also be maintained over the time duration of a network fault.

The invention also relates to a wind energy installation having a converter as described above for feeding electrical power into a network. The invention furthermore relates to a corresponding method for operation of the converter. Reference is made to the above statements for a more detailed explanation.

BRIEF DESCRIPTION OF THE DRAWINGS

The invention will be described in the following text with reference to the attached drawing, which illustrates advantageous exemplary embodiments, and in which:

FIG. 4 shows a graph illustrating the phase angle during a network disturbance;

FIG. 5 shows a graph with angle errors during the network disturbance shown in FIG. 4; and FIG. 6 shows a power diagram with a real component and a wattless component.

DETAILED DESCRIPTION OF THE INVENTION

Figure 1:
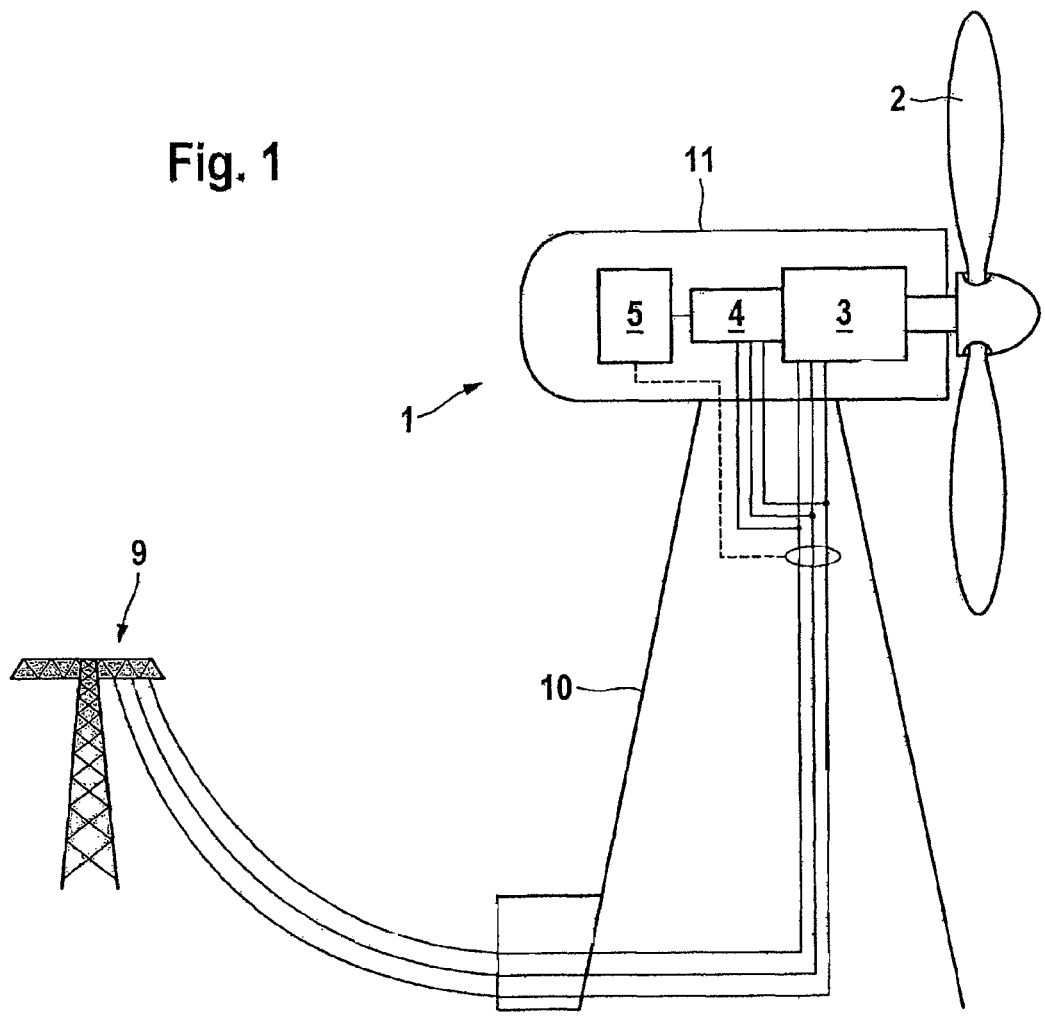
FIG. 1 shows a schematic overview illustration of a wind energy installation connected to an electrical supply network.

A wind energy installation which has a converter designed according to the invention is illustrated schematically in FIG. 1, and is provided in its totality with the reference number 1. In a manner known per se, which will not be explained in any more detail, the wind energy installation has a pod 11 which is arranged such that it can rotate on a tower 10. A wind rotor 2 is arranged on its end face, such that it can rotate. The wind rotor 2 drives a generator 3 via a rotor shaft. This generator 3 may, in particular, be in the form of a synchronous machine, an asynchronous machine (in each case coupled to the network via a converter), but preferably a double-fed asynchronous machine. A stator of the generator 3 is connected directly or via a transformer (not illustrated) to a three-phase connecting line to a network 9 of the wind power installation 1. A rotor (not illustrated) of the generator 3 is connected to a generator-side end of a converter 4, whose other, network-side end is connected to the network 9. A controller 5 is also provided for operation of the converter 4.

Figure 2:
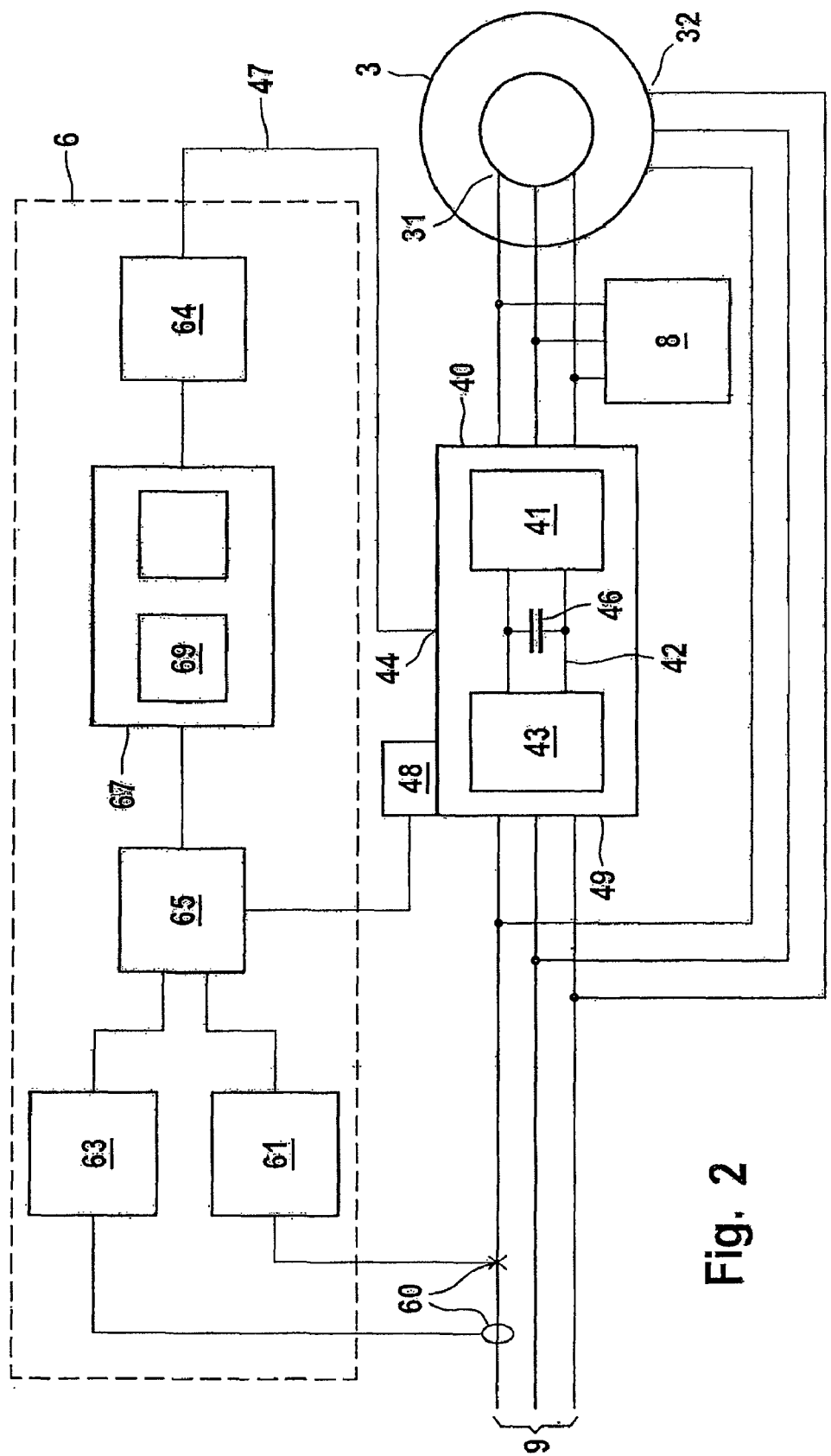
FIG. 2 shows a circuit diagram of a converter according to a first exemplary embodiment of the wind energy installation illustrated in FIG. 1.

The design and method of operation of the converter 4 will be explained with reference to the example of the wind energy installation. The invention can also be used for other types of electrical-energy generators which provide a converter for feeding the electrical power into the network. The converter 4 is primarily used to convert wild-frequency electrical power generated by the generator 3, which is driven at a variable rotation speed, such that the electrical power can be emitted at a frequency which matches that of a fixed-frequency supply network 9. FIG. 2 illustrates the application in which the converter 4 is connected to a double-fed asynchronous generator 3. A rotor 31 of the double-fed asynchronous generator 3 is connected to a generator-side end 40 of the converter 4. The supply network 9 is connected to a network-side end 49. The stator 32 of the generator 3 is connected directly to the electrical supply network.

The main components of the converter 4 comprise a generator-side inverter which is operated as a rectifier 41, a network-side inverter 43 and an intermediate circuit 42, which is arranged between them, as a connection. The rotor 31 of the generator 3 is connected to the generator-side inverter 41. A so-called crowbar circuit 8 can be arranged at this point, for overload protection. The crowbar circuit 8 is designed to short the rotor 31 and thus to prevent the occurrence of a damaging overvoltage. The design and method of operation of the crowbar circuit 8 are known from the prior art and therefore do not need to be explained in any more detail. The generator-side inverter 41 provides full-wave rectification for the three-phase current fed in from the rotor 31. The intermediate circuit 42 is in the form of a DC-voltage intermediate circuit and has a capacity 46 as an energy store. The network-side inverter 43 has six controllable switching elements, preferably IGBTs, in a full-bridge arrangement. The IGBTs are operated in a manner known per se by the controller 5 of the converter such that a three-phase current is produced at a variable frequency and a variable phase angle. The frequency and phase angle are in this case predetermined by the controller 5 such that they match those of the supply network 9. In addition, a control input 44 is provided for externally presetting the phase angle, via a control line 47.

The supply network 9 is connected to the output connection 49 of the converter 4, to be precise directly or via a transformer (not illustrated), with the output connection 49 being fed from the network-side inverter 43. Electrical energy which is generated by the rotor 31 of the generator 3 is therefore fed into the supply network 9 via the converter 4 (depending on the operating point of the generator 3, the power flow may also be reversed).

A sensor pair 60 for the phase angle of the voltage and current in the supply network 9 are arranged on the electrical supply network. The sensor pair 60 is illustrated on only one phase, for clarity reasons; the other phases are correspondingly equipped. The sensor pair 60 produces an input signal for a phase control device 6, which will be explained in more detail in the following text. The phase control device 6 comprises a phase angle detector 61, a network fault detector 63, an angle calculation unit 65 and a signal processing module 67, at whose output a preset value for the phase angle of the converter 4 is emitted. The output is connected via a control line 47 to the control input 44 of the converter 4. The signal processing module 67 contains a lead module which is in the form of a divider 69. The divider 69 is designed to halve the angle value produced by the angle error module 65, and to emit this as a lead angle via the control line 47.

The method of operation will be explained in more detail in the following text with additional reference to FIGS. 4 and 5. It is assumed that a network disturbance occurs as a result of a change in the phase angle of the voltage. It is assumed that the disturbance occurs at the time $t=t_0=0.2$ s. At this time, the phase angle suddenly changes by an amount of about 17 degrees in the inductive sense. The onset of the disturbance is determined by the network fault detector 63, and the absolute sudden phase change is determined at the same time by the phase angle detector 61. Taking account of the instantaneous network frequency, the angle error module 65 corrects the angle data, as determined by the phase angle detector 61, with the network frequency, and sets the initial angle to 0 degrees. This results in a representation of the network angle which is illustrated in FIG. 5 and can be evaluated for the subsequent signal processing module 67. As can easily be seen from the illustration in FIG. 5, the phase angle error, corrected to the network frequency, is 17 degrees. This value is applied as the phase error signal to the signal processing module 67. The divider 69 determines a lead angle of 8.5 degrees from this. This lead angle is emitted at the output of the signal processing module 67 and is applied, via a characteristic element 64 for magnitude limiting and the control line 47 to the control input 44 of the converter 4. This sets a control angle of 8.5 degrees inductive at the converter. This results in an operating point which lies on the straight line illustrated by dashed lines in FIG. 6. This setting of the converter 4 is optimum in the sense that, when the phase suddenly changes back at the end of the network disturbance (see $t=3.8$ s in FIGS. 4 and 5) this results in an angle change at the converter amounting to 17 degrees in the capacitive direction, which, on the basis of the said phase error of 8.5 degrees inductive, leads to a new phase angle of 8.5 degrees capacitive, as is illustrated by the dashed-dotted line in FIG. 6. The power output, which is symbolized by the horizontal solid line in FIG. 6, does not change, because the phase angle changes symmetrically with respect to the power axis. The power output of the converter 4 to the network 9 therefore remains unchanged, and the voltage in the intermediate circuit 42 of the converter in consequence also remains stable. This therefore makes it possible to avoid the derailment of the power control which frequently occurs in this situation in converters according to the prior art. This therefore also prevents triggering of the crowbar 8 in order to provide protection against a damaging overvoltage in the intermediate circuit 42. Thanks to the invention, when the network voltage returns, the converter 4 still feeds power into the network without any disturbance or interruption. The operation of the wind energy installation can be continued without any reactions occurring on the generator 3 and its drive train as a result of undesirable triggering of the crowbar 8.

A protection unit 48 is expediently provided on the converter and is used to detect the profile of the phase angle difference when the network voltage returns, using the angle data determined by the phase control device 6. The protection unit 48 acts on the network-side inverter 43 and can switch this off when a fault situation is identified. The protection unit 48 is designed to switch the network-side inverter 43 off when the phase difference between the network-side inverter 43 and the network 9 does not decrease, but increases, when the network voltage returns. This therefore provides maximum protection for the components even in extraordinary situations.

Figure 3:
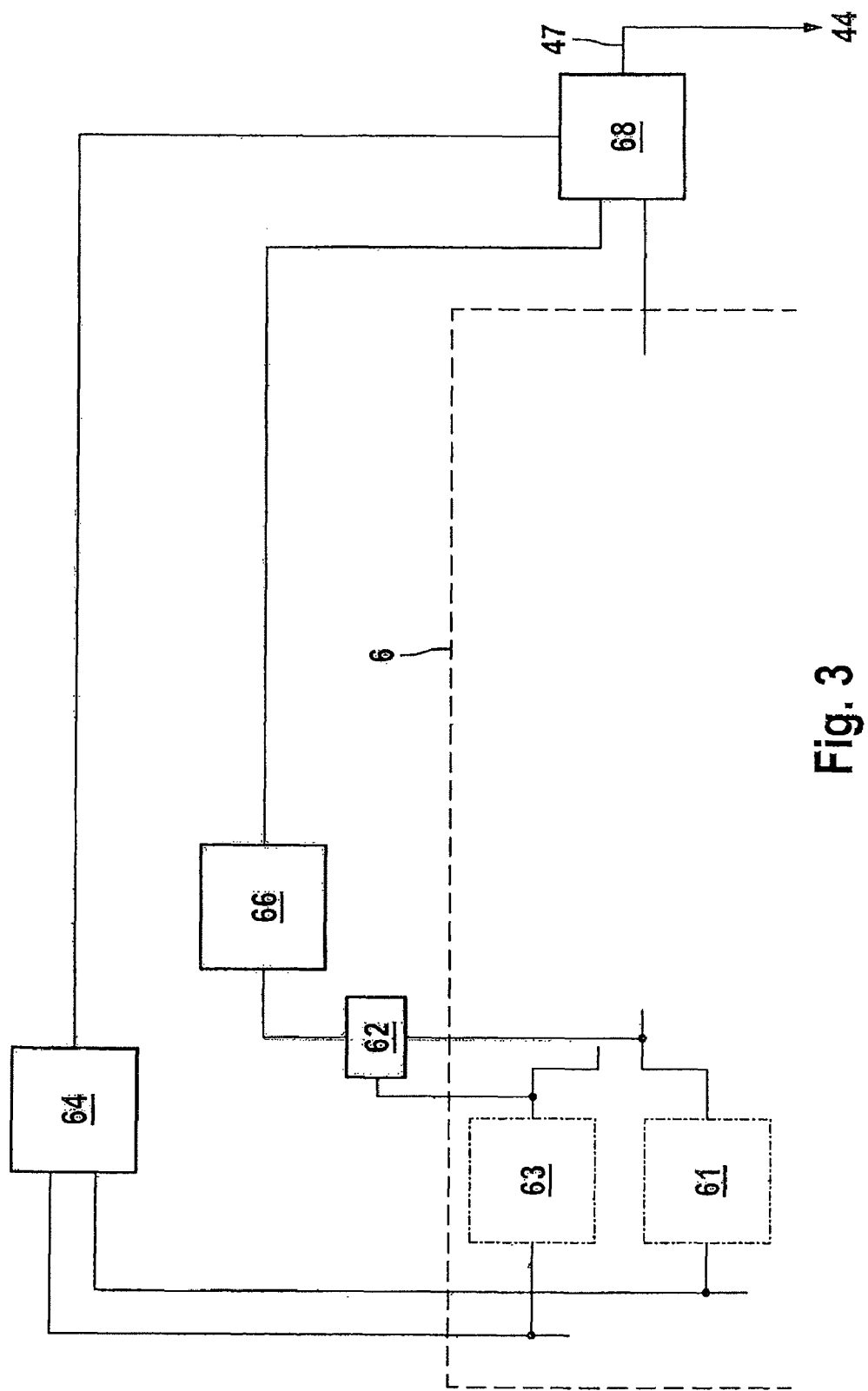
FIG. 3 shows a partial circuit diagram of one variation for a second exemplary embodiment.

A second exemplary embodiment is based on the first exemplary embodiment and has components as illustrated in FIG. 3 added to it. Corresponding elements are provided with the same reference symbols. Reference is made to the above explanation, in order to avoid explaining them again. In the second exemplary embodiment a reference frequency generator is also provided, and is in the form of a follow-up synchronization circuit (phase locked loop—PLL circuit) 66. A measured value for the phase of the network 9 is applied to its input. The reference angle determined by the phase angle detector 61 is applied to the PLL circuit 66. When a network fault is identified, the PLL circuit 66 is decoupled via a freewheeling device 62 and continues to oscillate freely. A device 64 is also provided in order to identify the return of the network voltage. In the exemplary embodiment, this device 64 is in the form of a threshold-value switch which emits an output signal for the return of the network when a sudden phase angle change above an adjustable threshold occurs. This output signal is applied to a control input of a switching device 68. When the switching device 68 is operated, then the network frequency signal, which is passed on from the PLL circuit 66, is passed on and is applied to the control input 44 of the converter 4. This variant operates as follows. The network angle is updated by means of the PLL circuit 66 throughout the duration of the disturbance in the network 9. When a sudden change in the phase angle occurs at the end of the disturbance in the network 9 (see the time $t_1$ in FIG. 5), then this is identified by the identification device 64. This emits a corresponding control signal to the switching device 68, as a result of which the output signal of the PLL circuit 66 is applied as a control signal to the converter 4. This ensures that the converter 4 can immediately orient itself again with respect to the network frequency provided as a reference by the PLL circuit 66. The converter 4 can therefore be resynchronized to the network more quickly, thus considerably shortening any possible transient process. The power control of the converter 4 can therefore operate immediately again, without any delay.

The invention claimed is:

1. A system for use with a generator for feeding electrical power into a network, the system comprising:
    a network fault detector identifying a fault in a network;
    a phase angle detector determining a phase signal when a fault in the network has been identified;
    an angle error calculation unit interacting with the network fault detector and being configured to perform a comparison between the phase angle before and after onset of the fault in the network and to generate a phase error signal based on said comparison;
    a signal processing module determining a preset angle signal which varies with the phase error signal; and
    a converter comprising a control line receiving the preset angle signal, the converter emitting electrical power having a phase angle which is offset corresponding to the preset angle signal.

2. The system of claim 1, wherein the signal processing module comprises a lead module determining a lead angle based on the phase error signal.

3. The system of claim 2, wherein the lead module comprises a divider having a divisor of 2.

4. The system of claim 2 or 3, further comprising a characteristic element limiting the lead angle to adjustable limit values.

5. The system of claim 4, wherein the limit values are determined based on permissible power and wattless-component ranges stored in a memory.

6. The system of claim 1, 2, or 3, wherein the phase angle detector comprises a pattern wave generator synchronized to a network frequency.

7. The system of claim 1, further comprising:
    a device identifying a network voltage return; and
    a switching device providing a reference frequency signal to the converter upon identification of the network voltage return.

8. A system of claim 7, wherein the reference frequency signal maps a network frequency.

9. A system of claim 7 or 8, further comprising a phase locked loop (PLL) circuit forming the reference frequency signal.

10. A system of claim 9, further comprising a freewheeling device decoupling the PLL circuit upon detection of the fault in the network.

11. A system of claim 7 or 8, further comprising a protection unit determining a phase angle difference between the network and a network-side inverter of the converter both before and after identification of the network voltage return, and switching off the network-side inverter if the phase angle difference before identification of the network voltage return is less than the phase angle difference after identification of the network voltage return.

12. A wind energy system comprising:
    a generator driven via a wind rotor;
    a network fault detector identifying a fault in a network;
    a phase angle detector determining a phase signal when a fault in the network has been identified;
    an angle error calculation unit interacting with the network fault detector and being configured to perform a comparison between the phase angle before and after onset of the fault in the network and to generate a phase error signal based on said comparison;
    a signal processing module determining a preset angle signal which varies with the phase error signal; and
    a converter comprising a control line receiving the preset angle signal, the converter receiving electrical power from the generator and emitting electrical power having a phase angle which is offset corresponding to the preset angle signal.

13. A method for operating a converter for use with a generator, comprising:
    identifying a fault in a network;
    determining a phase angle when a fault in the network has been identified;
    calculating a phase error signal by comparing the phase angle before and after onset of the fault in the network;
    determining a preset angle signal which varies with the phase angle error;
    receiving electrical power from the generator; and
    emitting electrical power having a phase angle which is offset corresponding to the preset angle signal.

14. A method of claim 13, wherein the generator is driven by a wind rotor of a wind energy installation and the network is connected to the wind energy installation.

* * * * *

UNITED STATES PATENT AND TRADEMARK OFFICE
CERTIFICATE OF CORRECTION

PATENT NO. : 8,378,514 B2  
APPLICATION NO. : 12/447200  
DATED : February 19, 2013  
INVENTOR(S) : Jens Fortmann et al.

Page 1 of 1

It is certified that error appears in the above-identified patent and that said Letters Patent is hereby corrected as shown below:

Title Page, Item (73) Assignee:

Please delete "REPower Systems AG" and replace with --REpower Systems AG--

Signed and Sealed this
Sixth Day of August, 2013

Teresa Stanek Rea
*Acting Director of the United States Patent and Trademark Office*